United States Patent
Wirtz

[11] Patent Number: 5,940,134
[45] Date of Patent: Aug. 17, 1999

[54] MARKING A VIDEO AND/OR AUDIO SIGNAL

[75] Inventor: Gijsbrecht C. Wirtz, Eindhoven, Netherlands

[73] Assignee: U.S. Philips Corporation, New York, N.Y.

[21] Appl. No.: 08/762,624

[22] Filed: Dec. 9, 1996

[30] Foreign Application Priority Data

Dec. 11, 1995 [EP] European Pat. Off. .............. 95203432

[51] Int. Cl.⁶ ........................................................ H04N 7/08
[52] U.S. Cl. ............................................. 348/473; 386/94
[58] Field of Search ..................................... 348/571, 473, 348/474, 476, 486, 432, 434, 435, 436, 1; 380/5, 3; 455/2; 386/95, 94; H04N 7/08, 7/087

[56] References Cited

U.S. PATENT DOCUMENTS

| | | |
|---|---|---|
| 4,218,697 | 8/1980 | Leventer .................................. 348/478 |
| 5,517,252 | 5/1996 | Plantholt .................................. 348/432 |
| 5,627,655 | 5/1997 | Okamoto .................................... 386/95 |
| 5,668,603 | 9/1997 | Copeland .................................. 348/473 |

FOREIGN PATENT DOCUMENTS 5153637  6/1993  Japan ............................. H04N 11/14

*Primary Examiner*—David E. Harvey
*Attorney, Agent, or Firm*—Laurie E. Gathman

[57] ABSTRACT

Method and arrangement for marking a video or audio signal to assign a classification to said signal, for example, to identify that the signal is authentic and may not be copied. The signal comprises at least two components (Y, UV) according to a predetermined standard (MPEG, PAL, NTSC). According to the invention, values are assigned to said components which in combination can normally not occur. For example, in black picture portions where Y, U and V are all zero, U and/or V are now wilfully made non-zero to constitute the watermark. Television receivers still display said black portion. The watermark is not lost when the signal is re-encoded and copied on a recordable disc. A player will not reproduce the copy because the watermark no longer corresponds with the "wobble key" of the new disc.

15 Claims, 1 Drawing Sheet

MARKING A VIDEO AND/OR AUDIO SIGNAL

FIELD OF THE INVENTION

The invention relates to a method and arrangement for marking a video or audio signal. The invention also relates to a method and arrangement for decoding said marked signal and a recording medium on which said marked signal is recorded.

BACKGROUND OF THE INVENTION

Known methods of marking a video signal are disclosed in WO 93/00769 and EP-A 0 518 616. The known methods modify a video signal such that certain disturbances in the picture are introduced upon playback. It is also known to mark a video signal by adding data to the signal. One method is to accommodate data in the vertical blanking interval. Another method is to blank a rectangular picture portion and replace said picture portion by a sequence of white and black spots that can be detected by a photodiode in front of the picture tube.

Nowadays, the subject of marking a signal is especially relevant with respect to the copy protection of digital video discs. It is desirable to provide the signal with a detectable code ("watermark") so as to identify the signal as being authentic and to render reproduction of the signal possible under specified conditions only. Video disc players are envisaged that are adapted to playback authentic video discs only. They reproduce recorded program material only if the video signal's watermark corresponds with a code ("wobble key") physically embedded in a given groove of the disc and not provided on a recordable disc.

The prior art methods mentioned above are not suitable to fulfil this task. They rely on the different sync behavior of different types of domestic equipment, render it possible for a consumer to delete the watermark, or suffer from the disadvantage that the embedded mark affects the displayed signal.

OBJECT AND SUMMARY OF THE INVENTION

It is an object of the invention to mark a signal without introducing perceptible disturbances in the signal upon reproduction.

In accordance with the invention, the method of marking a video and/or audio signal comprising at least two components according to a predetermined standard, is characterized by the step of assigning values to said components which in combination cannot occur when the signal is generated according to said standard.

The invention exploits the property that particular combinations of component values never occur when real signals are generated. By wilful introduction of said combinations without offending the relevant standard, the signal is classifiable in such a manner that the classification can be detected by special detector means.

Generally, the assignment of otherwise not occurring component values may cause visible artifacts on screen. This is prevented in an embodiment of the invention, wherein the step of assigning comprises modifying a first of said components in a signal portion where a second of said components assumes a value for which the first of said component is redundant.

The first and second component may constitute the chrominance and luminance of a video signal, respectively. A preferred embodiment of the invention is characterized in that a predetermined non-zero chrominance value is assigned to signal portions for which the luminance value is substantially zero. When encoded by a standard (PAL or NTSC) encoder, black signal portions have both zero luminance and zero chrominance. However, a zero luminance value in combination with a non-zero chrominance value is not prohibited by the relevant television standard. By introducing said non-zero chrominance values in black portions, the signal can be marked. The mark can easily be detected by inspecting the luminance and chrominance values. Standard television equipment (receiver, recorder) processes the black signal portions as such.

As it is not known in advance whether and where a video signal comprises black signal portions, it is envisaged to suppress one of the top or bottom video lines of a frame or field, and to apply the method to said video line. For the duration of said line, a plurality of consecutive chrominance periods may together constitute a binary watermark code.

In the future, video programs will be stored on disc in a digital format. A method of watermarking digital signals, in particular MPEG2 encoded video signals, has been proposed in Applicant's European patent application 95202673.0, not published yet. However, watermarking a digital signal is not the complete solution to the complicated problem of preventing digital video discs from being illegally copied. Any recorded digital signal is eventually decoded into an analog format so as to be displayed by a television receiver. After decoding, a digital watermark is lost. Nobody can prevent a consumer from re-encoding the analog signal to a digital (MPEG2) signal and store it on a recordable disc. Now, the disc comprises a signal without watermark. Such a signal can not be distinguished from, inter alia, a home video.

The method according to the invention, when applied to the signal before being recorded on an authentic video disc, has the significant advantage that the watermark is not lost. The specific combinations of zero luminance and non-zero chrominance values constituting the watermark are perfectly acceptable for an MPEG encoder (their presence merely affects the coding efficiency slightly). A video disc player, which is arranged to check the embedded watermark against the disc's wobble key, reproduces the signal if the authenticity of the signal is acknowledged. However, if a consumer re-encodes the reproduced analog signal and records the encoded signal on a different recordable disc, the watermark is retained and no longer corresponds with the new disc's wobble key. Consequently, the video disc player will not reproduce the copy thus made.

DESCRIPTION OF EMBODIMENTS

Figure 1:
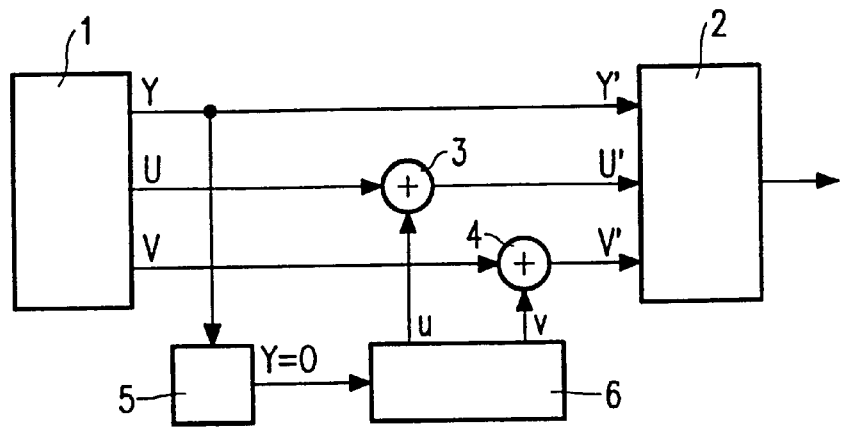
FIGS. 1 and 2 show embodiments of arrangements for marking a signal in accordance with the invention.

FIG. 1 shows one embodiment of an arrangement for marking a video and/or audio signal in accordance with the invention. In this Figure, reference numeral 1 denotes a video signal source which generates a conventional video signal in the form of a luminance component Y and two chrominance components U and V. The luminance component Y is directly applied to a conventional video encoder 2. The chrominance components are applied to said encoder via respective modification stages 3 and 4 which, in the present embodiment, are adders. The video encoder 2 encodes signal component Y and modified chrominance components U' and V' into a composite signal for transmission in accordance with a given standard such as PAL/NTSC/SECAM (analog) or JPEG/MPEG (digital).

The arrangement further comprises a black luminance detector 5 which produces a control signal Y=0 if the luminance value Y is substantially zero, i.e. if the corresponding picture area is black. The control signal Y=0 is applied to a mark generator 6 which, in response thereto, produces predetermined non-zero signal values u and v are. The values u and v added to the chrominance components U and V by adders 3 and 4, respectively. For natural video source material, the signal components Y, U and V from video signal source 1 are all zero in black picture areas. The arrangement provides that the video encoder 2 encodes Y'=0, U'=u≠0 and V'=v≠0 in said areas. For non-black picture areas, the mark generator 6 is inactive and the video encoder encodes Y'=Y, U'=U and V'=V as in conventional arrangements.

Figure 2:
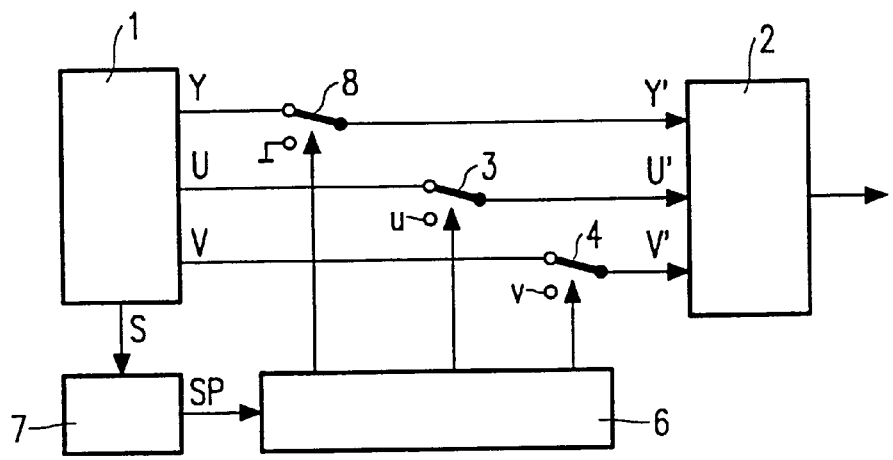

The arrangement shown in FIG. 1 relies on the presence of black signal portions in the picture. FIG. 2 shows a further embodiment of an arrangement which forces a predetermined signal portion of the picture to be black. FIG. 2 also illustrates that the modification stages 3 and 4 (which are adders in FIG. 1) may be switches. The arrangement shown in FIG. 2 operates as follows. During the predetermined signal portion (for example, the first or last active video line or portion thereof), the mark generator 6 controls a switch 8 to apply a luminance value Y=0 to the video encoder and, simultaneously, controls switches 3 and 4 to provide non-zero chrominance values U=u and V=v. The predetermined signal portion is defined by a timing circuit 7 which receives a conventional synchronization signal S from the video source and produces a timing signal SP which defines the period of time when the mark generator 6 is to be active.

The signal generated by the arrangements described above can be reproduced by conventional apparatuses. Experiments have shown that the black portions will be displayed as such. However, apparatuses such as video disc players can be designed to reproduce a watermarked signal only under special conditions, for example, if the signal has been recorded on a video disc having a specific "wobble groove". A significant advantage of the invention is that the watermark is not lost when the signal is re-encoded and copied on a recordable disc not having such a wobble groove. Accordingly, the player will not reproduce the signal from such a recordable disc.

Figure 3:
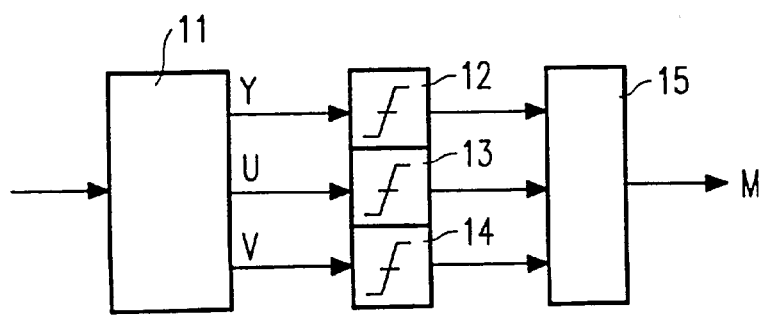
FIG. 3 shows an arrangement for detecting a marked video and/or audio signal in accordance with the invention.

FIG. 3 shows an arrangement for detecting a marked video and/or audio signal in accordance with the invention. The arrangement comprises a conventional analog (e.g. PAL/NTSC/SECAM) or digital (e.g. MPEG) decoder 11 which decodes the luminance component Y and chrominance components U and V. The components are applied to respective zero detectors 12, 13 and 14, which generate a binary signal '1' if the relevant component is substantially zero. A combinational logic circuit 15 produces an output signal M if the luminance component Y is substantially zero and the chrominance components U and V are not both substantially zero. Because such combinations of component values cannot occur in natural video scenes, the output signal M indicates that the video signal has been marked and may be reproduced under specified conditions only.

In summary, a method and arrangement for marking a video or audio signal is disclosed to assign a classification to said signal, for example, to identify that the signal is authentic and may not be copied. The signal comprises at least two components (Y, UV) according to a predetermined standard (MPEG, PAL, NTSC). According to the invention, values are assigned to said components which in combination can normally not occur. For example, in black picture portions where Y, U and V are all zero, U and/or V are now wilfully made non-zero to constitute the watermark. Television receivers still display said black portion. The watermark is not lost when the signal is re-encoded and copied on a recordable disc. A player will not reproduce the copy because the watermark no longer corresponds with the "wobble key" of the new disc.

I claim:

1. A method of marking a video and/or audio signal which has at least two components, said components having values which are related according to a predetermined encoding standard; said method comprising the steps of:

identifying a region of said signal wherein a first of said components has a predetermined value; and assigning to a second of said components a value in said region which, although in compliance with said standard, is nevertheless inconsistent with said predetermined value of the first of said components.

2. A method as claimed in claim 1 wherein, when the first of said components has said predetermined value in a region of said signal, the value of the second of said components in said region is irrelevant to compliance with said standard.

3. A method as claimed in claim 1, wherein said first and second components respectively represent luminance and chrominance components of said signal, and a predetermined non-zero value is assigned to the chrominance component in regions of said signal wherein the luminance component has a value of substantially zero.

4. A method of detecting whether a video signal which has at least two components is marked in accordance with a predetermined encoding standard relating to the relative values of said components; said method comprising the steps of:

determining whether there is a region of said video signal wherein a first of said components has a value of substantially zero; and determining whether all other components of said video signal have non-zero values in said region, and in that event providing an output signal signifying that the video signal is marked in accordance with said standard.

5. A method as claimed in claim 4 wherein, when the first of said components is substantially zero in said region the values of the other video signal components in said region are irrelevant to compliance with said standard.

6. A method as claimed in claim 4, wherein said first component represents luminance and at least one of the other signal components represents chrominance, and said output signal is produced when the luminance component is substantially zero in a region of said video signal which includes at least one non-zero chrominance component.

7. A device for marking a video and/audio signal which has at least two components, said components having values which are related in accordance with a predetermined encoding standard; comprising:

detecting means for identifying a region of said signal wherein a first of said components has a predetermined value; and mark generating means for assigning to a second of said components a value in said region which, although in compliance with said standard, is inconsistent with said predetermined value of said first component.

8. A device as claimed in claim 7 wherein, when the first of said components has said predetermined value in a region of said signal, the value of the second of said components in said region is irrelevant to compliance with said standard.

9. A device as claimed in claim 7, wherein said first and second components represent luminance and chrominance components of said signal, said predetermined value of the luminance component is substantially zero in said region, and a non-zero value is assigned to the chrominance component in said region.

10. A device for detecting whether a video and/or audio input signal having at least two components is marked in accordance with a predetermined encoding standard relating to the values of said components; comprising:

first detecting means for receiving said input signal and deriving therefrom a first detection signal indicating whether there is a region of said input signal wherein a first of said components has a substantially zero value;

second detecting means for also receiving said input signal and deriving therefrom a second detection signal signifying whether there is in said region a second component of said input signal having a non-zero value; and calculating means coupled to said first and second detection means and responsive to the detection signals produced thereby to produce a marking signal when said first component has a substantially zero value in said region and said second component has a non-zero value in said region.

11. A device as claimed in claim 10, wherein when the value of said first component is substantially zero in said region the value of the second signal component is irrelevant to compliance with said standard.

12. A device as claimed in claim 10, wherein said first component represents luminance, said second signal component represents chrominance, and said marking signal is produced when in said region of the input signal the luminance is substantially zero and the chrominance has a non-zero value.

13. A video and/or audio signal which is marked to indicate a classification thereof, said signal having at least two components the values of which are related according to a predetermined encoding standard; said signal having a region wherein a first of said components has a predetermined value and a second of said components has a value which, although in compliance with said standard, is nevertheless inconsistent with said predetermined value of the first component.

14. A signal as claimed in claim 13 wherein, when the first of said components has said predetermined value in a region of said signal, the value of the second of said components in said region is irrelevant to compliance with said standard.

15. A signal as claimed in claim 13 wherein the first and second components represent luminance and chrominance respectively; and portions of said signal wherein the luminance value is substantially zero have a predetermined non-zero chrominance value.

* * * * *